United States Patent
Jain et al.

(10) Patent No.: US 9,705,821 B1
(45) Date of Patent: Jul. 11, 2017

(54) METHODS FOR PROVISIONING APPLICATIONS BASED ON ANTICIPATED USER WORK LOAD AND DEVICES THEREOF

(71) Applicant: F5 Networks Inc., Seattle, WA (US)

(72) Inventors: Amit Jain, Santa Clara, CA (US); Charles Cano, New York, NY (US)

(73) Assignee: F5 Networks, Inc., Seattle, WA (US)

( * ) Notice: Subject to any disclaimer, the term of this patent is extended or adjusted under 35 U.S.C. 154(b) by 469 days.

(21) Appl. No.: 14/502,515

(22) Filed: Sep. 30, 2014

Related U.S. Application Data

(60) Provisional application No. 61/884,728, filed on Sep. 30, 2013.

(51) Int. Cl.
*G06F 15/173* (2006.01)
*H04L 12/911* (2013.01)
*H04L 12/26* (2006.01)

(52) U.S. Cl.
CPC ............ *H04L 47/823* (2013.01); *H04L 43/08* (2013.01)

(58) Field of Classification Search
CPC .............................. H04L 47/823; H04L 43/08
See application file for complete search history.

(56) References Cited

U.S. PATENT DOCUMENTS

| | | | |
|---|---|---|---|
| 7,331,038 B1* | 2/2008 | Snodgrass | G06F 17/30893 715/751 |
| 2002/0128908 A1* | 9/2002 | Levin | G06Q 30/02 705/14.53 |
| 2006/0013229 A1* | 1/2006 | Johansson | H04L 12/5695 370/395.41 |
| 2009/0248858 A1* | 10/2009 | Sivasubramanian | G06F 17/30887 709/224 |
| 2010/0323715 A1* | 12/2010 | Winters | G01S 5/0027 455/456.1 |
| 2012/0131627 A1* | 5/2012 | Chittella | H04N 21/2381 725/109 |
| 2012/0140620 A1* | 6/2012 | Hogan | H04L 41/0893 370/230 |
| 2013/0100819 A1* | 4/2013 | Anchan | H04W 48/20 370/241 |
| 2013/0269007 A1* | 10/2013 | Yoshigaki | H04L 9/3226 726/5 |

(Continued)

OTHER PUBLICATIONS

Wilkes, S., "Automating F5 Application Services for VMware with F5 BIG-IQ Cloud", F5 Networks Inc., White Paper, Apr. 26, 2013, pp. 1-9, <www.f5.com.

(Continued)

*Primary Examiner* — Jonathan Bui
(74) *Attorney, Agent, or Firm* — LeClairRyan, a Professional Corporation

(57) ABSTRACT

A method, non-transitory computer readable medium and an application manager computing device that assists with provisioning applications based on user anticipated workloads includes obtaining, a user anticipated resource based on information within a user workload database, prior to receiving a request from a client computing device. The obtained user anticipated resource is provisioned. The provisioned user anticipated resource is provided upon establishing a session with the requesting client computing device.

15 Claims, 6 Drawing Sheets

(56) References Cited

U.S. PATENT DOCUMENTS

| | | | |
|---|---|---|---|
| 2013/0336126 A1* | 12/2013 | Vasseur | H04L 41/147 370/236 |
| 2014/0089384 A1* | 3/2014 | Diaz | H04W 72/048 709/203 |
| 2014/0113600 A1* | 4/2014 | El Gamal | H04W 28/16 455/414.3 |
| 2016/0070601 A1* | 3/2016 | Yamamoto | G06F 9/5077 718/105 |

OTHER PUBLICATIONS

F5 Networks Inc., "F5 and VMware Integration Streamlines App Provisioning Process", F5 Networks Inc., Solution Overview, Jun. 24, 2013, pp. 1-2, <www.f5.com>.

* cited by examiner

METHODS FOR PROVISIONING APPLICATIONS BASED ON ANTICIPATED USER WORK LOAD AND DEVICES THEREOF

This application claims the benefit of U.S. Provisional Patent Application Ser. No. 61/884,728 filed on Sep. 30, 2013, which is hereby incorporated by reference in its entirety.

FIELD

This technology generally relates to methods and devices for network management and, more particularly, to methods for provisioning applications based on anticipated user work load and devices thereof.

BACKGROUND

The acquisition and use of applications on different computing devices at the same or different times continues to grow at a rapid pace. To manage this growing demand for these applications, existing technologies have been developed to provision applications based on a demand level. For example, when a request has been received for a particular application, existing technologies will simply provision that application to the requesting client device. However, this provisioning with existing technologies becomes more complicated when there are multiple computing devices requesting an application at the same time.

Unfortunately, with existing technologies when multiple computing devices request the same application, the speed at which that application can be delivered to each of the requesting computing devices slows down. Additionally, the sudden demand for applications also drastically increases the power or resource consumption of the data center hosting the application or applications.

SUMMARY

A method for provisioning applications based on anticipated user work load includes obtaining, by an application manager computing device, a user anticipated resource based on information within a user workload database, prior to receiving a request from a client computing device. The obtained user anticipated resource is provisioned by the application manager computing device. The provisioned user anticipated resource is provided by the application manager computing device upon establishing a session with the requesting client computing device.

A non-transitory computer readable medium having stored thereon instructions for provisioning applications based on anticipated user work load comprising machine executable code which when executed by at least one processor, causes the processor to perform steps including obtaining, a user anticipated resource based on information within a user workload database, prior to receiving a request from a client computing device. The obtained user anticipated resource is provisioned. The provisioned user anticipated resource is provided upon establishing a session with the requesting client computing device.

An application manager computing device including at least one of configurable hardware logic configured to be capable of implementing or a processor coupled to a memory and configured to execute programmed instructions stored in the memory for obtaining, a user anticipated resource based on information within a user workload database, prior to receiving a request from a client computing device. The obtained user anticipated resource is provisioned. The provisioned user anticipated resource is provided upon establishing a session with the requesting client computing device.

This technology provides a number of advantages including providing a method, non-transitory computer readable medium and apparatus that assists with provisioning applications based on user anticipated workloads. By continuously monitoring and storing the information in the user workload database the technology disclosed herein can accurately anticipate, obtain resource and provision the resource even before receiving the request from the client computing devices.

DETAILED DESCRIPTION

Figure 1:
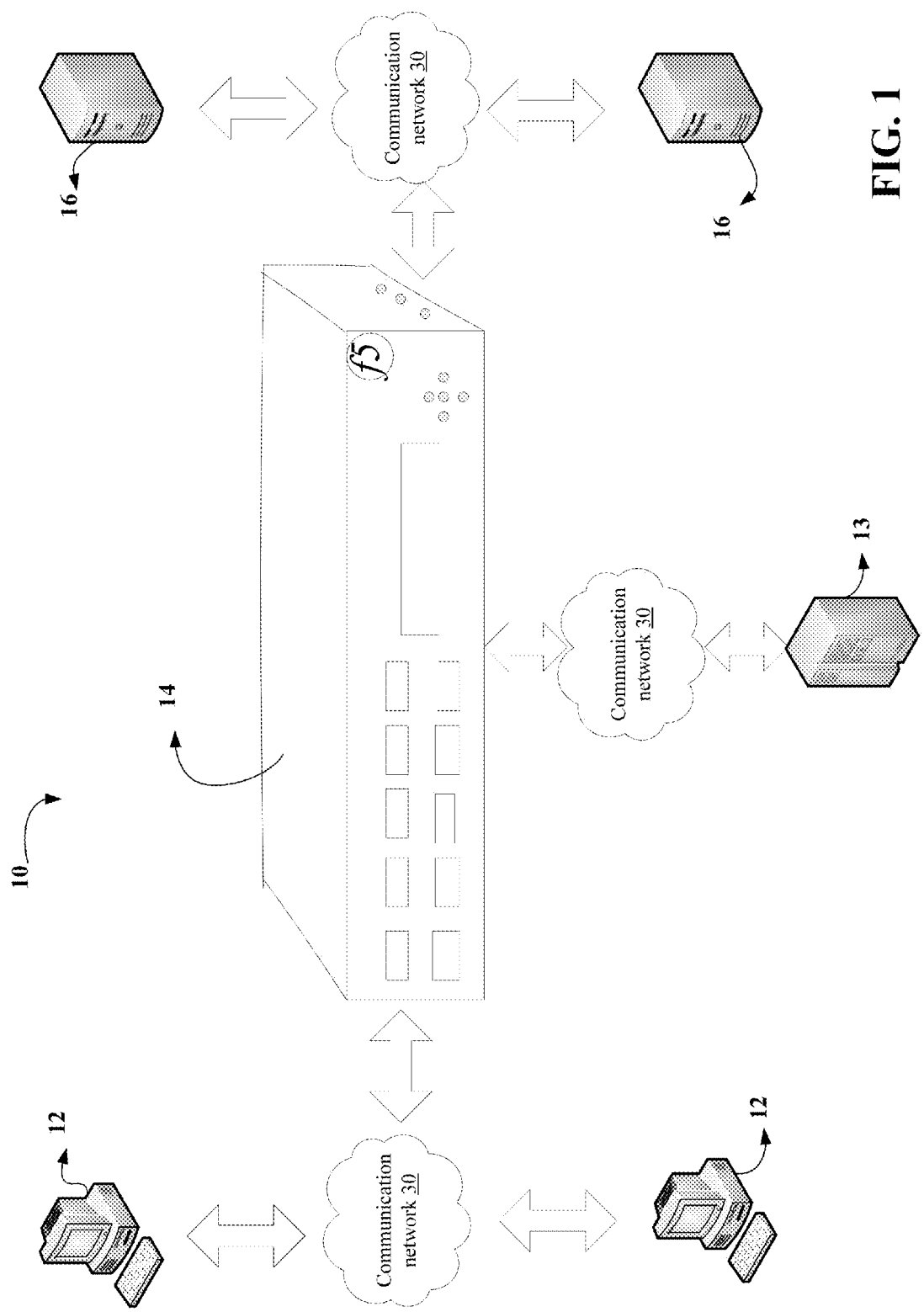
FIG. 1 is an example of a block diagram of an environment including an application manager computing device for provisioning applications based on anticipated user work load.
Figure 2:
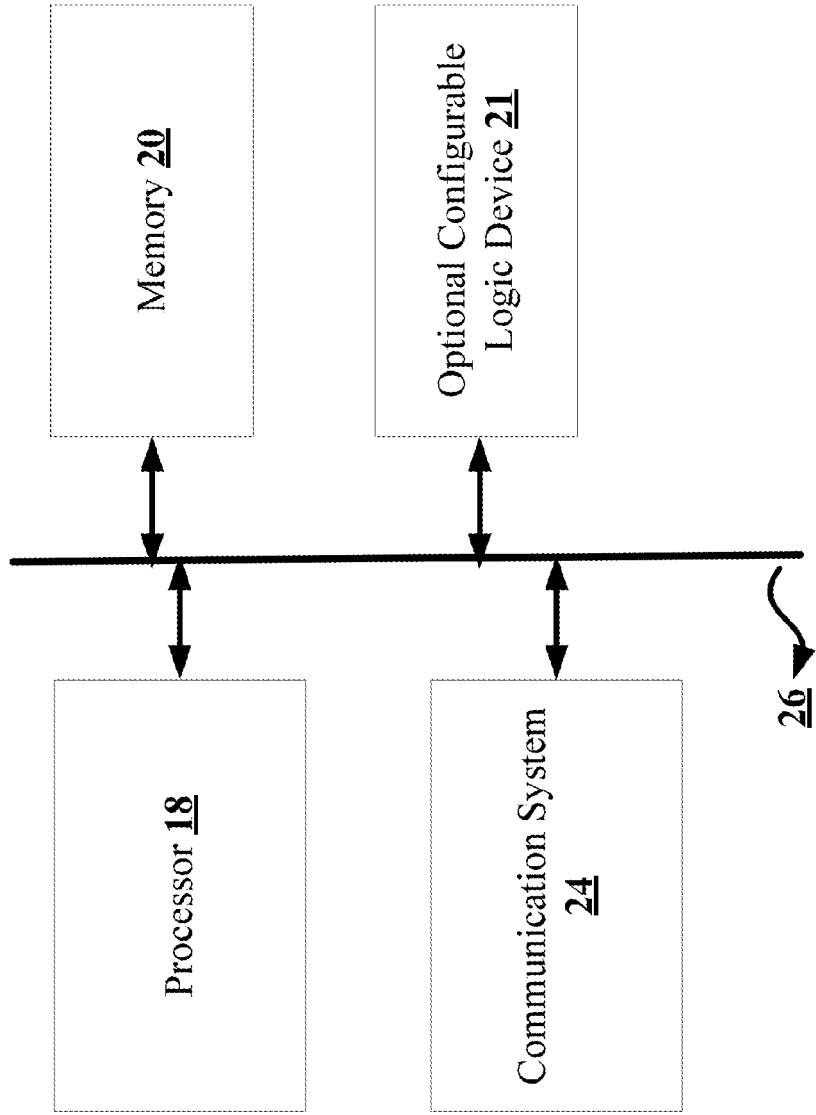
FIG. 2 is an example of a block diagram of an application manager computing device.

An example of a network environment 10 with an application manager computing device 14 for provisioning applications based on anticipated user work load is illustrated in FIGS. 1 and 2. The exemplary environment 10 includes plurality of client computing devices 12, a user workload database 13, the application manager computing device 14, and a plurality of external resource servers 16 which are coupled together by communication network 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including provisioning applications based on anticipated user workload.

Referring more specifically to FIG. 1, application manager computing device 14 is coupled to the plurality of client computing devices 12 through the communication network 30, although the plurality of client computing devices 12 and application manager computing device 14 may be coupled together via other topologies. Further, the application manager computing device 14 is coupled to the user work load database 13 through the communication network 30, although the plurality of client computing devices 12 and application manager computing device 14 may be coupled together via other topologies. Additionally, the application manager computing device 14 is coupled to the plurality of external resource servers 16 through the communication network 30, although the plurality of external resource servers 16 and application manager computing device 14 may be coupled together via other topologies.

The application manager computing device 14 assists with provisioning applications based on anticipated user work load as illustrated and described with the examples herein, although application manager computing device 14 may perform other types and numbers of functions. As illustrated in FIG. 2, the application manager computing device 14 includes at least one processor 18, memory 20, optional configurable logic device 21, and communication system 24 which are coupled together by bus 26, although application manager computing device 14 may comprise other types and numbers of elements in other configurations.

At least one processor 18 may execute one or more computer-executable instructions stored in the memory 20 for the methods illustrated and described with reference to the examples herein, although the at least one processor can execute other types and numbers of instructions and perform other types and numbers of operations. The at least one processor 18 may comprise one or more central processing units ("CPUs") or general purpose processors with one or more processing cores, such as AMD® processor(s), although other types of processor(s) could be used (e.g., Intel®).

Figure 3:
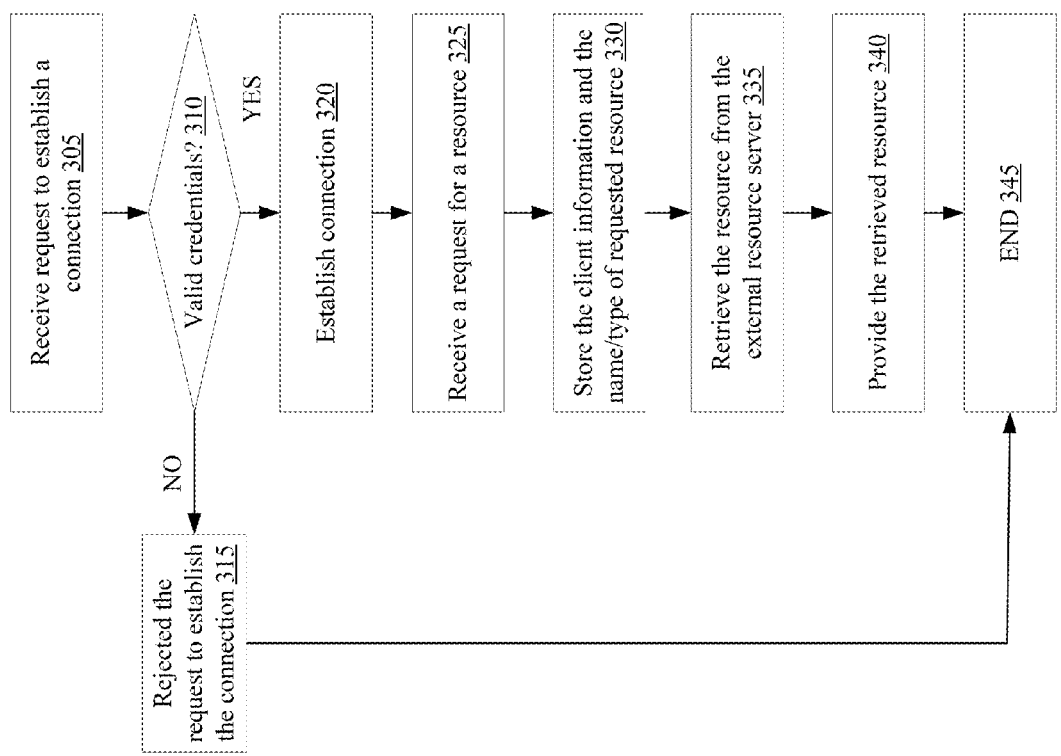
FIG. 3 is an example of a flowchart of a method for creating a user profile.
Figure 4:
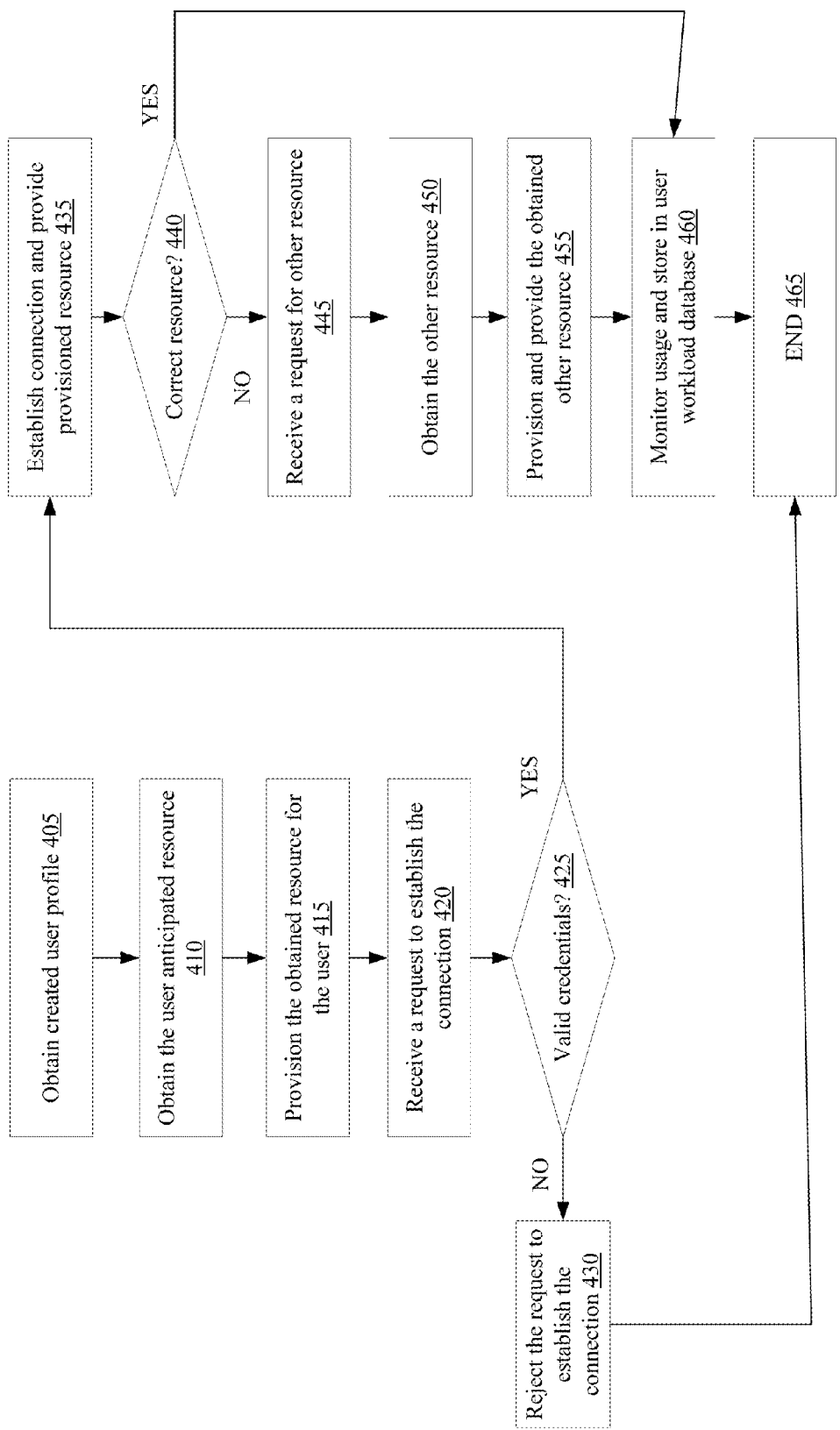
FIG. 4 is an example of a flowchart of a method for provisioning applications based on anticipated user workload.

Memory 20 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. Memory 20 may store one or more non-transitory computer-readable instructions of this technology as illustrated and described with reference to the examples herein that may be executed by the at least one processor 18. The flow chart shown in FIGS. 3 and 4 is representative of example steps or actions of this technology that may be embodied or expressed as one or more non-transitory computer or machine readable instructions stored in memory 20 that may be executed by the at least one processor 18 and/or may be implemented by configured logic in the optional configurable logic device 21.

The optional configurable logic device 21 may comprise specialized hardware configured to implement one or more steps of this technology as illustrated and described with reference to the examples herein. By way of example only, the optional configurable logic device 21 may comprise one or more of field programmable gate arrays ("FPGAs"), field programmable logic devices ("FPLDs"), application specific integrated circuits (ASICs") and/or programmable logic units ("PLUs").

The communication system 24 in the application manager computing device 14 is used to operatively couple and communicate between the application manager computing device 14 and the plurality of client computing devices 12, the user workload database 13 and the plurality of external resource servers 16 which are all coupled together by communication network 30 such as one or more local area networks (LAN) and/or the wide area network (WAN), although other types and numbers of communication networks or systems with other types and numbers of connections and configurations to other devices and elements. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other bus types and links may be used, such as PCI.

Each of the plurality of client computing devices 12, include a central processing unit (CPU) or processor, a memory, input device, display device, optional configurable logic device and a communication system, which are coupled together by a bus or other link. Each of the plurality of client computing devices 12, in this example, may run interface applications, such as Web browsers, that may provide an interface to make queries for and send data to make requests for and send content and/or data to different server based applications at the plurality of external resource servers 16 via the communication network 30, although other types of application may also run on each of the plurality of client computing devices 12.

Additionally, the user workload database 13 includes a central processing unit (CPU) or processor, a memory, input device, display device interface, configurable logic device and a network interface, which are coupled together by a bus or other link, although each could comprise other numbers and types of elements and component. In this example, the user workload database 13 includes information relating to information received from the plurality of client computing devices 12, although the user workload database 13 can include other types and amounts of information.

Each of the plurality of external resource servers 16 include a central processing unit (CPU) or processor, a memory, and a communication system, which are coupled together by a bus or other link, although other numbers and types of network devices could be used. Generally, the plurality of external resource servers 16 process requests received from requesting client computing devices via the communication network 30 according to the HTTP-based application RFC protocol or the CIFS or NFS protocol in this example, but the principles discussed herein are not limited to this example and can include other application protocols. A series of applications may run on the plurality external resource servers 16 that allow the transmission of data, such as a data file or metadata, requested by the plurality client computing devices 12 or the application manager computing device 14. The plurality of external resource servers 16 may provide data or receive data in response to requests directed toward the respective applications on the plurality of external resource servers 16 from the plurality of client computing devices 12 or the application manager computing device 14. It is to be understood that the plurality of external resource servers 16 may be hardware or software or may represent a system with multiple external resource servers, which may include internal or external networks. In this example the plurality of external resource servers 16 may be any version of Microsoft® IIS servers or Apache® servers, although other types of servers may be used.

Although an exemplary environment 10 with the plurality of client computing devices 12, the application manager computing device 14, and the plurality of external resource servers 16, communication network 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein. An example of a method for provisioning applications based on anticipated user work load will now be described herein with reference to FIGS. 1-6.

Figure 5:
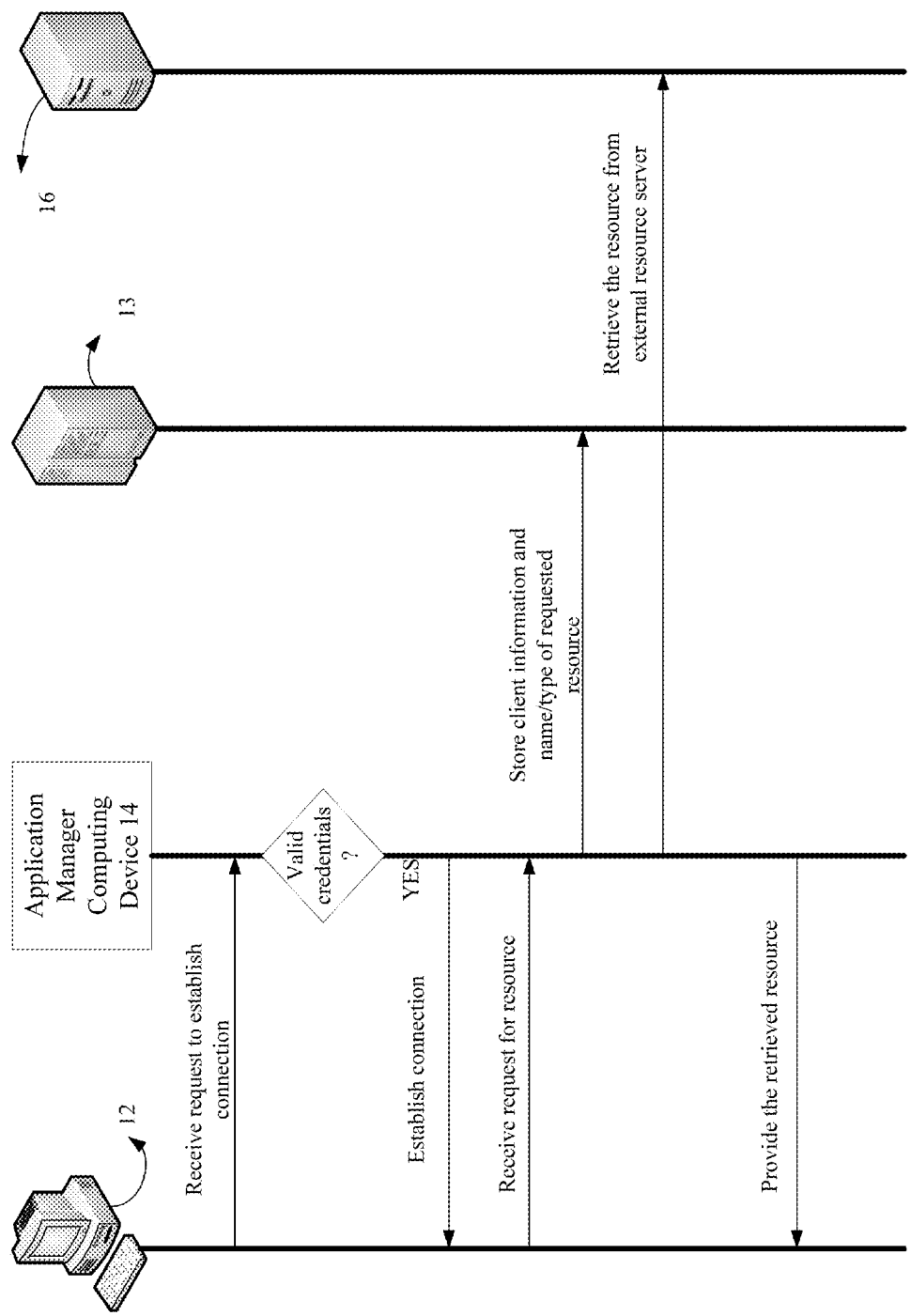
FIG. 5 is an example of a timing diagram illustrating the method for creating a user profile.

Referring more specifically to FIGS. 3 and 5, in step 305 the application manager computing device 14 receives a request from one of the plurality of client computing devices 12 to establish a session, although the application manager computing device 14 can receive other types of requests from other devices. In addition to the request, the application manager computing device 14 also receives user credentials, such as username and/or password, to establish session from the requesting one of the plurality of client computing devices 12, although the application manager computing device 14 can receive other types and amounts of information from the requesting one of the plurality of client computing devices 12.

Next in step 310, the application manager computing device 14 determines if the received user credentials is valid. By way of example only, the application manager computing device 14 compares the received user credentials with the corresponding stored user credentials within the memory 20 to determine if the received user credentials are valid, although the application manager computing device 14 can use other techniques to make the determination of validity. In this example, when the received user credentials matches exactly with the stored user credentials, then the received user credentials is determined to be valid. If the application manager computing device 14 determines that the received user credentials are not valid, then the No branch is taken to step 315. In step 315, the application manager computing device 14 rejects the request to establish the session and this example of the method ends in step 345.

However, if the application manager computing device 14 determines that the received user credentials are valid, then this example of the method takes a Yes branch to step 320. In step 320, the application manager computing device 14 proceeds to establish a session with the requesting one of the plurality client computing devices 12.

Upon establishing a session with the requesting one of the plurality of client computing devices, in step 325, the application manager computing device 14 receives a request for a resource from the requesting one of the plurality of client computing devices 12. By way of example only, the resource can be an application, such as an email client, a video player, or network resource, e.g. bandwidth, although the application manager computing device 14 can receive request for other types of resources. In this example and for purpose of further illustration, the requested resource is an email client.

Next in step 330, the application manager computing device 14 stores the information received from requesting one of the plurality of client computing devices 12 such as a time of receiving the request, type of resource requested, or location of the requesting one of the plurality of client computing devices 12 as a profile of the requesting one of the plurality of client computing devices 12 in the user workload database 13, although the application manger computing device 14 can store other types of information relating to the requesting one of the plurality of client computing devices 12 at other memory locations. Additionally, the application manager computing device 14 can identify the created profile associated with the requesting one of the plurality of client computing devices 12 by tagging the created profile associated with a unique identifier of the requesting one of the plurality of client computing devices 12 such as an internet protocol address, or the medium access control identification (Mac Id) of the requesting one of the plurality of client computing devices 12, although the application manager computing device 14 may use other types of techniques to store the created profile. By storing the information received from the requesting one of the plurality of client computing devices 12, the application manager computing device 14 develops a user workload database 13 which could be later used to anticipate and provision the resource before receiving the request from the requesting one of the plurality of client computing devices 12.

In step 335, the application manager computing device 14 obtains the requested resource from one of the plurality of external resource servers 16 having the requested resource, although the application manager computing device 14 may obtain the requested resource from other locations.

In step 340, the application manager computing device 14 provides the obtained resource to the requesting one of the plurality of client computing devices 12 and this example of a process of creating a database of user workload ends in step 345. By way of example only, the application manager computing device 14 may use the above illustrated technique for every interaction with the plurality of client computing devices 12 thereby building an effective user workload database 13. The following exemplary process illustrates the method for provisioning applications based on anticipated user work load using the user workload database 13.

Figure 6:
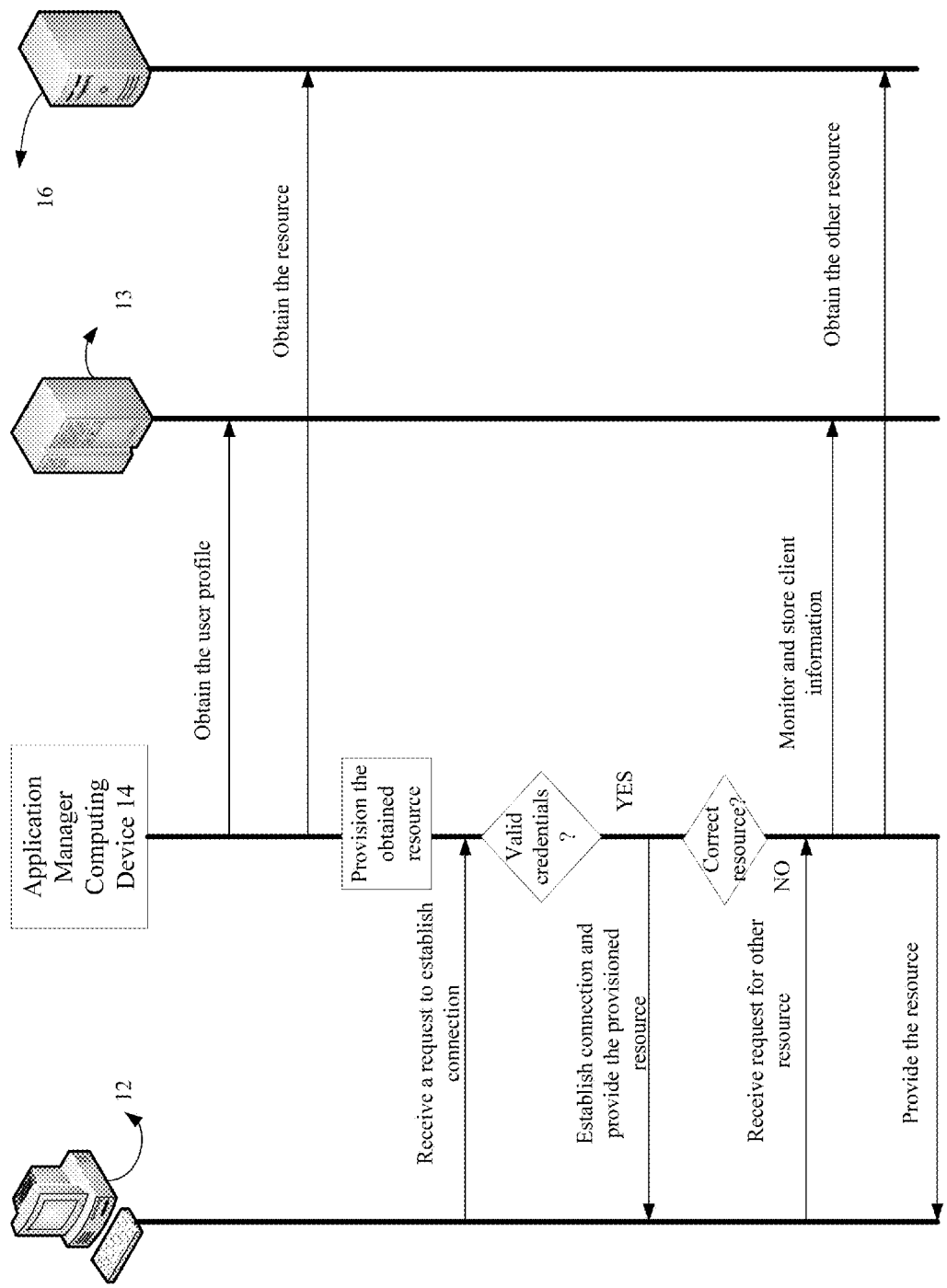
FIG. 6 is an example of a timing diagram illustrating the method for provisioning applications based on anticipated user workload.

With respect to FIGS. 4 and 6, in step 405, the application manager computing device 14 obtains a created user profile from the user workload database 13 when one or more events are triggered, although the application manager computing device 14 may obtain the user profile based on other parameters. In this example, the events can relate to a particular time of the day when the application manager computing device 14 anticipates receiving a request for a resource from one of the plurality of client computing devices 12, although the events can relate to other types of circumstances associated with the requesting one of the plurality of client computing devices 12. By way of example only, the user profile includes information such as time of receiving the request, type of resource being requested, geographical location of the requesting one of the plurality of client computing devices 12, although the user profile information can include other types or amounts of information.

Next in step 410, based on the obtained user profile, the application manager computing device 14 obtains the anticipated resource from one of the plurality of external resource servers 16, although the application manager computing device 14 can obtain the anticipated resource from other locations. By way of example only, if the application manager computing device 14 receives a request for three consecutive days at 9:00 am to access an email client, as previously illustrated, the application manager computing device 14 creates a user profile storing the time of receiving the request and the type of application being requested and stores the user profile in the user workload database 13. Using this created user profile; the application manager computing device 14 automatically on the fourth day obtains the email client at 9:00 am even before receiving the request from one of the plurality of client computing devices 12.

In step 415, the application manager computing device 14 provisions the obtained anticipated resource prior to receiving the requested from one of the plurality of client computing devices 12.

Next in step 420, the application manager computing device 14 receives a request from one of the plurality of client computing devices 12 to establish a session along with user credentials as previously illustrated in an exemplary step of 305 of FIG. 3.

In step 425, the application manager computing device 14 determines if the received user credentials is valid using technique illustrated in step 310 of FIG. 3, although the application manager computing device 14 can use other techniques to make the determination. If the application manager computing device 14 determines that the received user credentials are not valid, then a No branch is taken to step 430. In step 430, the application manager computing device 14 rejects the request to establish the session and this example of the process ends in step 465.

However, if the application manager computing device 14 determines that the received user credentials are valid, then a Yes branch is taken to step 435. In step 435, the application manager computing device 14 proceeds to establish a session with the requesting one of the plurality of client computing devices 12. In this example, once the session has been established, the application manager computing device 14 provides the provisioned resource to the requesting one of the plurality of client computing device 12 prior to receiving a request for the resource from the requesting one of the plurality of client computing devices 12.

In step 440, the application manager computing device 14 determines if the provisioned anticipated resource is the resource required by the requesting one of the plurality of client computing devices 12. By way of example only, the application manager computing device 14 determines if the provisioned anticipated resource is a resource required by the requesting one of the plurality of client computing devices 12 by checking with the requesting one of the plurality of client computing devices 12, although the application manager computing device 14 can use other techniques to make the determination. If the application manager computing device 14 determines that the provisioned anticipated resource is not the resource required by the requesting one of the plurality of client computing devices 12, a No branch is taken to step 445. In step 450, the application manager computing device 14 receives a new request for other resource from the requesting one of the plurality of client computing devices 12.

However, if the application manager computing device 14 determines that the anticipated resource is the resource required by the requesting one of the plurality of client computing devices 12, then a Yes branch is taken to step 460 which will be further illustrated below.

As a response to the new request, in step 455, the application manager computing device 14 obtains the requested resource from one of the plurality of external resource servers 16, although the application manager computing device 14 can obtain the requested application from other locations.

Upon obtaining the other resource, in step 460, the application manager computing device 14 provisions the obtained other resource and provides the provisioned other resource to the requesting one of the plurality of client computing devices 12.

In step 460, the application manager computing device 14 continues to monitor the session and stores the events monitored in the user workload database 13 and this example of the process ends in step 465.

Accordingly, as illustrated and described with the examples herein, this technology more effectively assists with provisioning applications based on user anticipated workload. By continuously monitoring and storing the information in the user workload database, the application manager computing device can accurately anticipate, obtain resource and provision the resource even before receiving the request from the plurality of client computing devices.

Having thus described the basic concept of the disclosed technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the disclosed technology. Additionally, the recited order of processing elements or sequences, or the use of numbers, letters, or other designations therefore, is not intended to limit the claimed processes to any order except as may be specified in the claims. Accordingly, the disclosed technology is limited only by the following claims and equivalents thereto.

What is claimed is:

1. A method for provisioning applications based on anticipated user work load, the method implemented by a network traffic management system comprising one or more network traffic apparatuses, client devices, or server devices and the method comprising:

obtaining a user anticipated resource based on information within a database, prior to receiving a request from a client;

provisioning the obtained user anticipated resource;

determining whether the provisioned user anticipated resource is requested by the requesting client;

providing the provisioned user anticipated resource upon establishing a session with the requesting client when the provisioned user anticipated resource is determined to be requested by the requesting client;

wherein when the provisioned user anticipated resource is determined not to be requested by the requesting client, the determining further comprises:

receiving a new request for a new resource from the requesting client;

obtaining the new resource in response to receiving the new request from the requesting client; and providing the obtained new resource to the requesting client.

2. The method as set forth in claim 1 further comprising:

receiving a request to establish the session along with a user credentials from the requesting client;

determining when the received user credentials are valid; and establishing the session when the received user credentials are determined to be valid.

3. The method as set forth in claim 1 further comprising:

monitoring, the established session with the requesting client for one or more events; and storing the one or more events in the database while monitoring.

4. The method as set forth in claim 2 wherein the determining further comprises rejecting the request to establish the session when the received user credentials are determined not to be valid.

5. The method as set forth in claim 1 further comprising monitoring the session upon providing the obtained new resource for one or more new events; and storing the one or more new events in the database while monitoring.

6. A non-transitory computer readable medium having stored thereon instructions for provisioning applications based on anticipated user work load comprising machine executable code which when executed by at least one processor, causes the processor to:

obtain a user anticipated resource based on information within a database, prior to receiving a request from a client;

provision the obtained user anticipated resource;

determine whether the provisioned user anticipated resource is requested by the requesting client computing device;

provide the provisioned user anticipated resource upon establishing a session with the requesting client when the provisioned user anticipated resource is determined to be requested by the requesting client;

wherein when the provisioned user anticipated resource is determined not to be requested by the requesting client, the determining further comprises:

receiving a new request for a new resource from the requesting client;

obtaining the new resource in response to receiving the new request from the requesting client; and providing the obtained new resource to the requesting client.

7. The medium as set forth in claim 6 further comprising:

receive a request to establish the session along with a user credentials from the requesting client;

determine when the received user credentials are valid; and establish the session when the received user credentials are determined to be valid.

8. The medium as set forth in claim 6 further comprising:

monitor the established session with the requesting client for one or more events; and store the one or more events in the database while monitoring.

9. The medium as set forth in claim 7 wherein the determining further comprises reject the request to establish the session when the received user credentials are determined not to be valid.

10. The medium as set forth in claim 6 further comprising monitor the session upon providing the obtained new resource for one or more new events; and store the one or more new events in the database while monitoring.

11. An application manager apparatus, comprising memory comprising programmed instructions stored in the memory and one or more processors configured to be capable of executing the programmed instructions stored in the memory to:

obtain a user anticipated resource based on information within a database, prior to receiving a request from a client;

provision the obtained user anticipated resource;

determine whether the provisioned user anticipated resource is requested by the requesting client;

provide the provisioned user anticipated resource upon establishing a session with the requesting client when the provisioned user anticipated resource is determined to be requested by the requesting client;

wherein the determining when the provisioned user anticipated resource is determined not to be requested by the requesting client further comprises:

receiving a new request for a new resource from the requesting client when the provisioned user anticipated resource is determined not to be requested by the requesting client;

obtaining the new resource in response to receiving the new request from the requesting client; and providing the obtained new resource to the requesting client.

12. The device as set forth in claim 11 wherein the one or more processors are further configured to execute the programmed instructions stored in the memory to:

receive a request to establish the session along with a user credentials from the requesting client;

determine when the received user credentials are valid; and establish the session when the received user credentials are determined to be valid.

13. The device as set forth in claim 11 wherein the one or more processors are further configured to execute the programmed instructions stored in the memory to:

monitor the established session with the requesting client for one or more events; and store the one or more events in the database while monitoring.

14. The device as set forth in claim 12 wherein the one or more processors are further configured to execute the programmed instructions stored in the memory wherein the determining further comprises reject the request to establish the session when the received user credentials are determined not to be valid.

15. The device as set forth in claim 11 wherein the one or more processors are further configured to execute the programmed instructions stored in the memory to:

monitor the session upon providing the obtained new resource for one or more new events; and store the one or more new events in the user workload database while monitoring.

* * * * *